United States Patent [19]

Hohenemser et al.

[11] 4,298,313
[45] Nov. 3, 1981

[54] HORIZONTAL AXIS WIND GENERATOR HAVING ADAPTIVE CYCLIC PITCH CONTROL

[76] Inventors: Kurt H. Hohenemser, 2421 Remington La., Brentwood, Mo. 63144

[21] Appl. No.: 49,348

[22] Filed: Jun. 18, 1979

[51] Int. Cl.³ .............................................. F03D 7/02
[52] U.S. Cl. ...................................... 416/98; 416/10; 416/11; 416/43
[58] Field of Search ....................... 416/37, 41, 23, 24, 416/DIG. 7, 43, 114, 18, 17, 13, 10

[56] References Cited

U.S. PATENT DOCUMENTS

| | | | |
|---|---|---|---|
| 1,818,672 | 8/1931 | Bucklen | 416/13 X |
| 3,536,415 | 10/1970 | Kusiak | 416/114 X |
| 4,083,651 | 4/1978 | Cheney et al. | 416/18 |
| 4,084,921 | 4/1978 | Norz | 416/17 |
| 4,160,170 | 7/1979 | Harner et al. | 416/41 X |
| 4,183,715 | 1/1980 | Ducker | 416/164 X |
| 4,201,514 | 5/1980 | Huetter | 416/102 X |

FOREIGN PATENT DOCUMENTS

| | | | |
|---|---|---|---|
| 69050 | 4/1949 | Denmark | 416/10 |
| 1104458 | 4/1961 | Fed. Rep. of Germany | 416/132 B |
| 437964 | 7/1948 | Italy | 416/10 |

*Primary Examiner*—Everette A. Powell, Jr.
*Attorney, Agent, or Firm*—Jerome A. Gross

[57] ABSTRACT

Cyclic pitch variation of the rotor blades of a horizontal axis wind energy conversion machine permit its operation at substantially design rotor speed and rotor torque over a range of wind speeds, by heading the rotor progressively out of the wind through a range from approximately 20° for light winds to a near 90° setting for gales, at which the power output is interrupted to permit the rotor to idle. Changes in wind direction will cause the rotor to follow the wind even though so headed out of it. By allowing the blades substantial freedom to adapt their pitch to side winds, the present construction allows rapid rates of yaw into a shifting wind, such as may destroy conventional rotors by the attendant gyroscopic forces. Further, by actively controlling their pitch, aerodynamic forces exerted by the cyclic pitch change blades substantially balance out the gyroscopic forces attendant to yaw.

The preferred rotor uses only two blades mounted on a common shaft which oscillates cyclically in the hub. Since cyclic variation of blade pitch establishes a cyclic pitch center of rotation offset from the rotor axis; by moving this offset the rotor is caused to yaw at a controlled rate in a desired sense.

18 Claims, 12 Drawing Figures

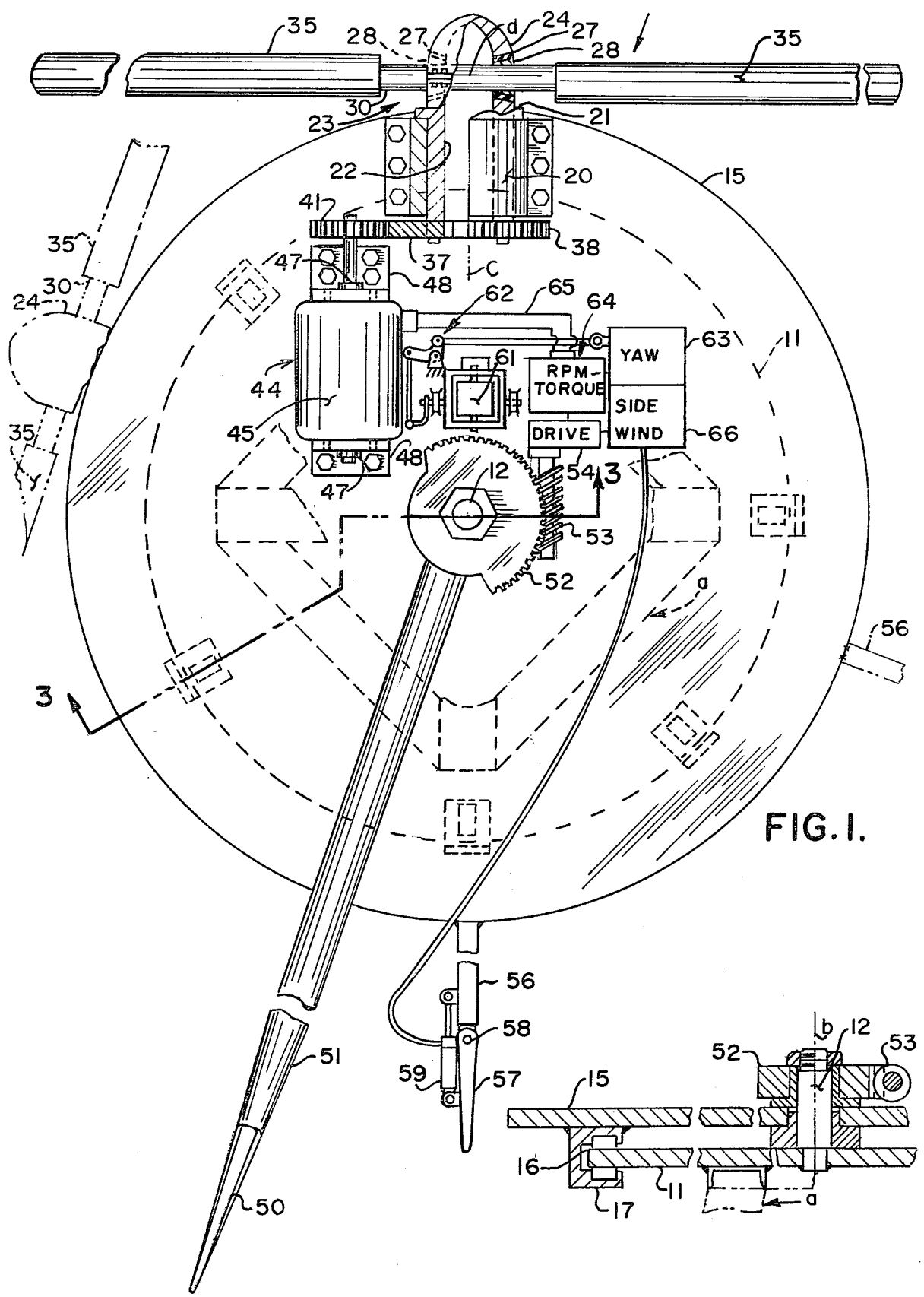

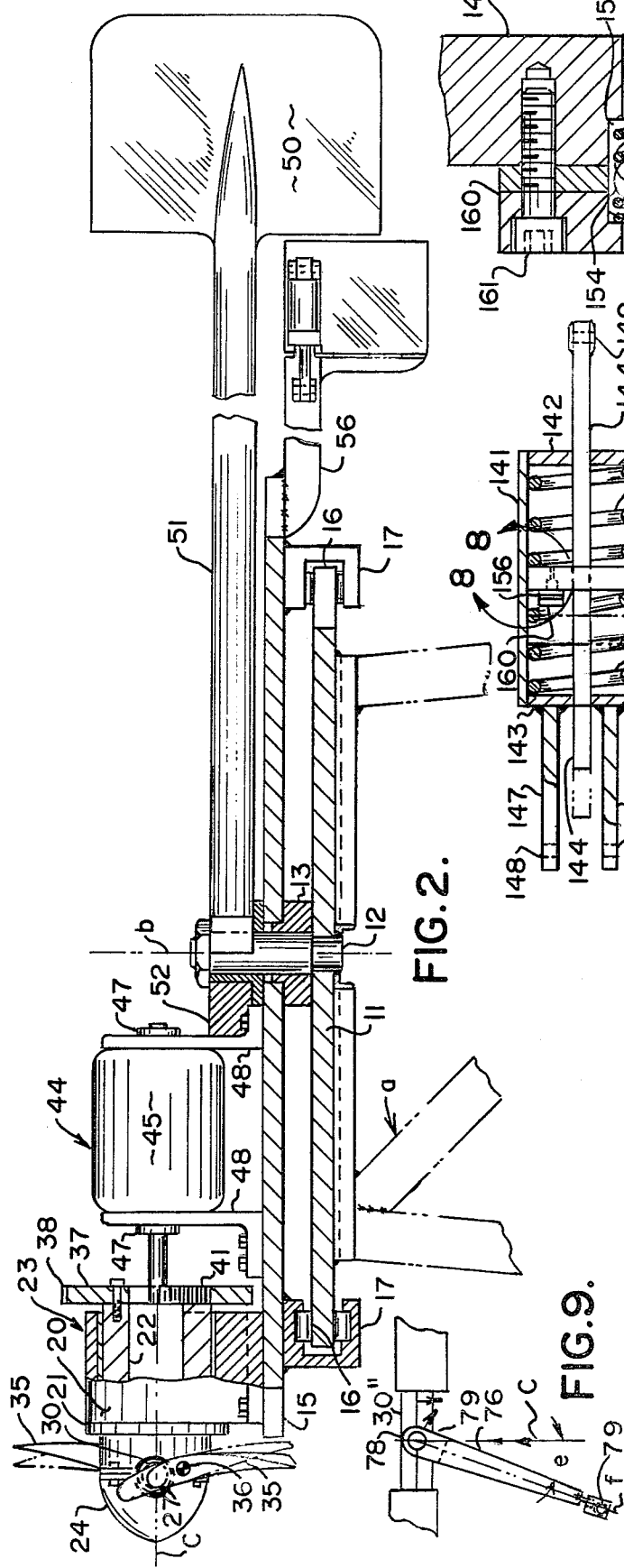
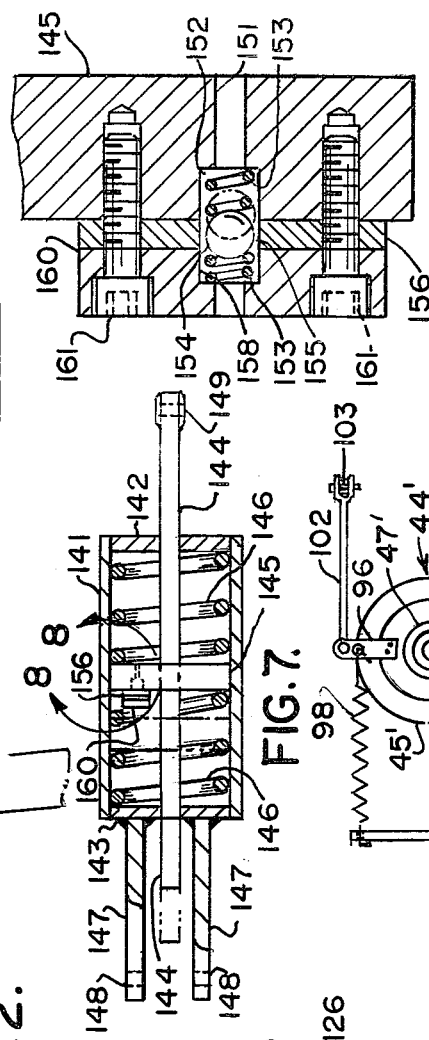
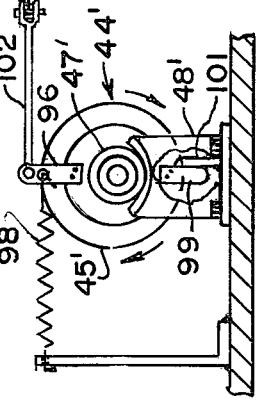
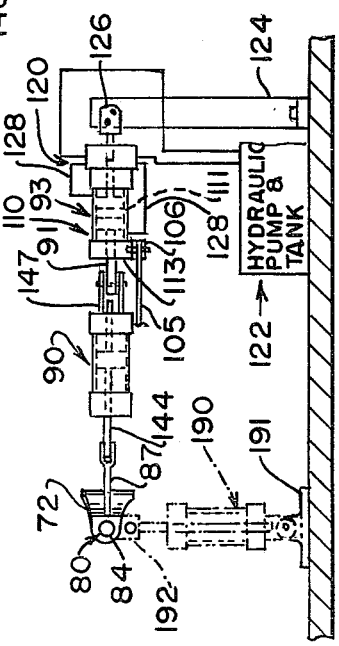

HORIZONTAL AXIS WIND GENERATOR HAVING ADAPTIVE CYCLIC PITCH CONTROL

BACKGROUND OF THE INVENTION

The present invention concerns the use of blade cyclic pitch control in horizontal axis wind energy converters.

The term blade cyclic pitch variation is used in the technology of helicopters and other rotorcraft when the blade pitch angle changes periodically with the period of rotor revolution. Control of blade pitch cyclically as the rotor rotates on its substantially vertical axis generally removes aerodynamic pitching and rolling moments and protects the rotorcraft in maneuvering flight from high gyroscopic moments. Hence, rotorcraft control systems superimpose cyclic pitch control on their collective pitch systems, which generally control the lift of the machine.

With wind turbines, which are usually horizontal axis machines and whose technology has been considered non-analogous, blades are sometimes feathered with increased wind speeds. This is in effect collective pitch control. The principles of cyclic pitch control have not been applied to such machines; although vertical axis gyromills use in effect a highly complex form of cyclic pitch variation.

It is general practice in the design of horizontal axis wind turbines to use blade feathering in order to prevent rotor overspeeding or overtorquing beyond rated wind speed. The blade feathering mechanism is complex and costly; the propeller type blades are exposed to high dynamic loads, and the propeller rotor can only be yawed very slowly to avoid blade overstressing from gyroscopic effects. Some early wind turbines had hinged or teetering blades in combination with the blade feathering mechanism. For large wind turbines this configuration has been again considered; relief from the weight and cost of the blade feathering mechanism has been sought by feathering only parts of the blades.

It has long been recognized that overspeed or overtorque control beyond rated wind speed might be accomplished by so gearing the rotor to the mast as to yaw it out of the wind, thus avoiding the complex and costly blade feathering mechanism. However, in addition to severe resultant loads on the mast, the blades suffer severe stresses when operating headed angularly out of the wind and when subjected to side wind gusts. To avoid destruction of the rotor, the permissible yaw rate must be so limited that effective response to such gusts is impossible.

In some simple fixed pitch horizontal axis wind mills whose forward-presented rotors are not geared to the mast, the hub axis has been positioned offset from the vertical axis about which yawing is permitted, and the trailing vane has been pivoted, spring loaded against one stop, and angularly movable at high winds to a second stop. The offset thrust of the rotor is roughly balanced by the moment of the wind force on the vane, in its position against the first stop, until the wind becomes too high for safe operation. The spring on the pivoted vane then yields; the vane moves to the other stop and yaws the rotor angularly out of the wind, the generator meantime being electrically disconnected. Spring loaded vanes have also been used to position rotors at angles advantageous for starting. No such system has been used as a matter of normal operation to maintain the rotor at a design operating parameter through a range of wind speeds.

In the present invention, as hereinafter described, blade cyclic pitch feedback is utilized somewhat in the manner of rotorcraft technology, and high yaw rates to accommodate shifting winds become possible with effective control of the yaw angle of the rotor axis relative to wind direction.

SUMMARY OF THE INVENTION

The combination of blade feathering, i.e. collective pitch control, with blade cyclic pitch variation—which combination is conventional in rotorcraft—requires complex mechanism and should be avoided for wind turbines. However, in the horizontal axis wind turbines of the present invention, compensation for changes in wind speed is effected by maintaining the rotor axis at an angle yawed from the direction of the wind; and this yaw angle maintenance is effected through the cyclic pitch variation mechanism, which is considerably simpler and less costly than a blade feathering mechanism. For a two-bladed rotor, both blades are mounted on a common shaft; the entire common shaft, with blades attached, oscillates through only a small angle of cyclic pitch variation, and conventional thrust bearings are not needed. In contrast, blade feathering would require large angular deflections, in which opposing blades were rotated in opposite directions. Accordingly, especially with a two-bladed rotor, substantially simpler design is possible using cyclic pitch variation than a feathering mechanism. Yet this simpler design affords many other advantages, discussed hereafter in greater detail, including rapid yawing to follow a shifting wind without either loading the mast or danger of destructive gyroscopic forces on the blade elements; speed and torque control by automatic change of angle of operation out of the wind; and ability to withstand gales without blade feathering.

To comprehend how these objectives are attained, it must first be understood that when a wind meets a rotating rotor at an angle to its horizontal axis, the rotor will react as follows:

Assuming for simplicity a two-bladed rotor whose blade pitch cannot change cyclically, the blade advancing into a side wind will undergo an increased aerodynamic load, while the retreating blade will undergo a lessened aerodynamic load. These loads will be transmitted by the blades to the hub with some angular lag, imposing on it a strong yawing moment which yaws the rotor rapidly into or out of the wind depending essentially on whether the rotor is located downwind or upwind of the mast. Because the rotor is rotating, the gyroscopic-inertia forces on each element of the blades will resist such yawing. If a severe side gust is encountered, the rotor may yaw so rapidly as to snap off the blades. To prevent this it is conventional to restrain rates of yaw by gearing the rotor to the mast. However, this constraint further increases the blade loads.

In clear contrast to that conventional problem, if the blades are free to adjust their pitch angle cyclically, as with the passive embodiments of the present invention, this tendency to yaw suddenly is substantially overcome. In the preferred embodiment, utilizing two blades secured to a common shaft and so proportioned that the centers of their aerodynamic loads are aft of the shaft axis, as the blade advancing into the side wind experiences the increased wind speed, its aerodynamic moment about the common shaft cannot be greater than that exerted by the retreating blade, hence, the pitch of the advancing blade is lessened while that of the retreating blade is increased compensatingly. This either overcomes or greatly lessens the rotor tendency to head into or out of the wind, so that it may be freed from restraint by the mast. Using such a passive cyclic pitch system, controlled wind-following at a safe rate is achieved by other means as will be described, the simplest of which may be a conventional, suitably proportioned trailing vane.

The term "cyclic pitch variation angle" means that range of angles—normally not greater than ±6°—which each blade undergoes cyclically; in the system utilizing two blades projecting from a common shaft, it is the angle through which the shaft oscillates cyclically.

The present invention utilizes the following principle of operation: at any chosen cyclic pitch variation angle, the rotor will be stable in yaw at some corresponding heading angle out of alignment with the wind.

To maintain the rotor speed and/or torque constant (or its thrust, if this parameter is selected) with increase in wind speed, the heading angle out of the wind is increased simply by increasing the cyclic pitch variation angle. Changes in rotor heading, either for this purpose or for following a shifting wind, may be safely effected at controlled rates by exerting active control over cyclic pitch—that is, by changing the cyclic pitch variation angle. This causes the blades to exert greater aerodynamic force as they reach one side of the rotor axis than when they reach the other side. The aerodynamic force thus exerted on each blade element offsets the gyroscopic-inertia forces on the same blade element. This offset of blade loading greatly increases the rate at which the rotor system may be safely yawed as when gusting or shifting winds are encountered. A rotor of relatively large diameter, say 150–200 feet, may thus be yawed at a rate calculated at substantially 18° per second, in contrast to a rate of one degree (1°) per second to which conventionally constructed rotors of similar diameter must be limited by restraint at the mast.

In both the preferred embodiments illustrated, two blades are retained in the opposite ends of a common shaft which oscillates cyclically in the rotor hub to change the pitch of the blades. When the shaft is so oscillating, the theoretical center about which the blade pitch remains constant is offset from the rotor axis. The center, referred to as the effective center for cyclic pitch, is, in the active-controlled embodiments of the present invention, made into a practical cyclic pitch control center; it receives and permits the rotation of a control arm which extends through the hub from the common shaft at its intersection with the rotor axis. When the cyclic pitch center is displaced transversely from the common shaft, the control arm will cause the common shaft to oscillate cyclically as the rotor rotates. Such an active control system may be used in a simple embodiment in which the mast is windward of the blades, to limit the tendency to head into the wind to a safe rate of yaw.

In the first illustrated embodiment in which the rotor is mounted forward of the mast, trailing wind-alignment means such as a vane is utilized. The forward-mounted rotor to be described is of the passive type; its blades are free to adapt their pitch cyclically. To so operate without active pitch control, the wind alignment vane has an angularly adjustable connection to the rotor platform, using geared mechanism which responds to chosen parameters, for example, rotor speed, torque or thrust to yaw the axis of the rotor progressively out of angular alignment with the vane.

A passive forward-mounted rotor is also used in the third embodiment described, in which thrust is maintained constant, after operating speed is reached, by mounting the rotor with its axis offset from the yaw axis.

BRIEF DESCRIPTION OF THE DRAWINGS

FIG. 1 is a plan view showing the principal operating components of an embodiment of wind generator utilizing passive cyclic pitch, and whose rotor is windward of the mast. The arrow at the top of the drawing shows the wind direction. The phantom lines at the left show the position of the rotor yawed to a large angle, as in a gale.

FIG. 2 is a side view, partly in elevation and partly in section, of a two-bladed rotor system corresponding to FIG. 1. The phantom lines show how cyclic oscillation of the common shaft which mounts the two blades results in increase of pitch of one blade with decrease of pitch of the other.

FIG. 3 is a sectional view taken along line 3—3 of FIG. 1.

FIG. 5 is a sectional view taken along line 5—5 of FIG. 4, said optional pitch control link being shown in phantom lines.

FIG. 6 is a sectional view taken along line 6—6 of FIG. 4.

FIG. 7 is an enlarged sectional view of a yieldable self-restoring link of the type shown in FIGS. 4 and 5.

FIG. 8 is a further enlarged detail of the region 8—8 of FIG. 7.

FIG. 9 is an explanatory schematic view showing how cyclic oscillations of the common shaft of the rotor system may be effected by moving, angularly from the rotor axis, a rigid control arm which is the mechanical equivalent of the flexure-type arm of FIG. 4A.

DESCRIPTION OF THE PREFERRED EMBODIMENT

Figure 4:
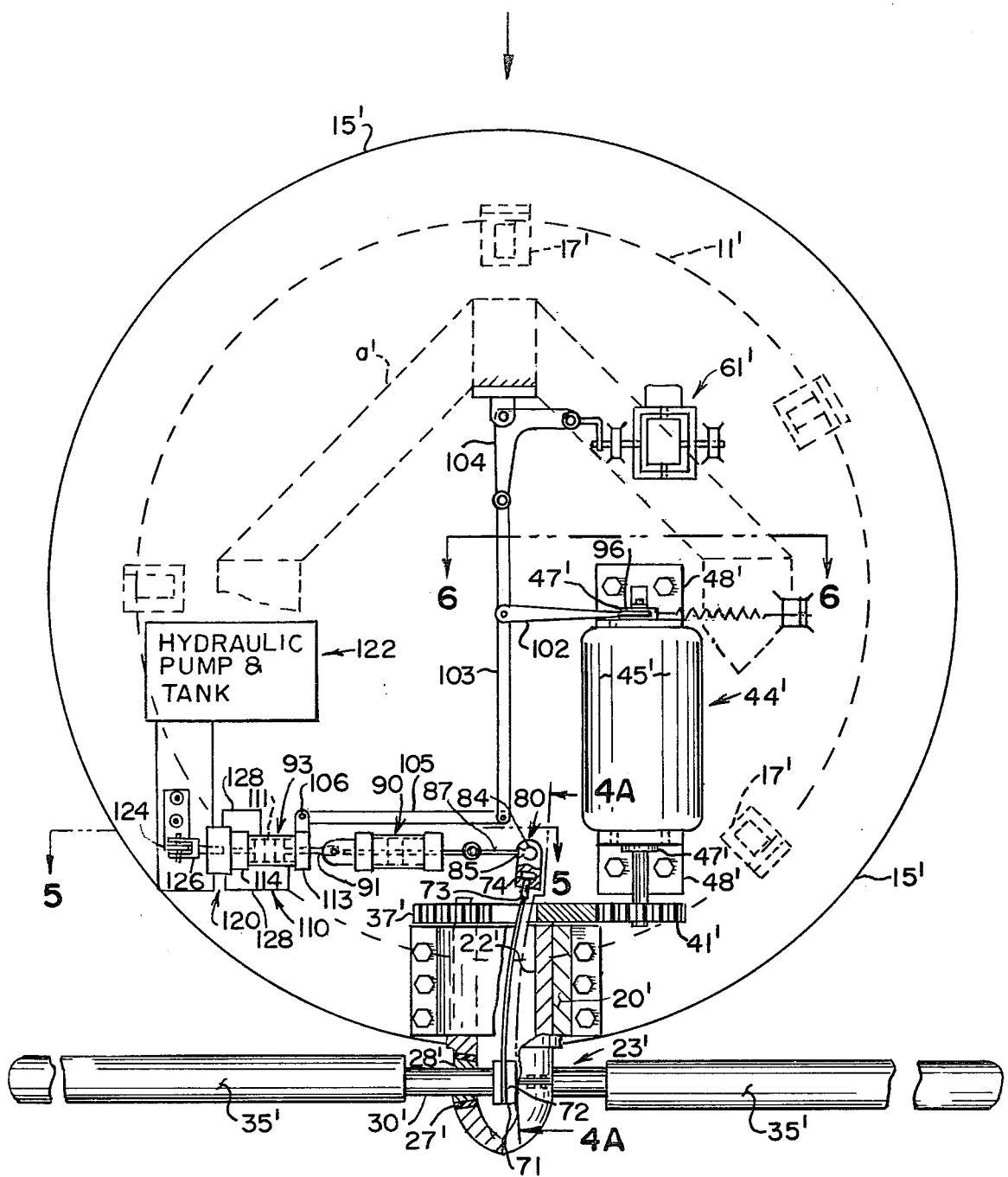
FIG. 4 is a plan view of an embodiment utilizing active cyclic pitch, and whose rotor is positioned aft of the mast. Servo-control is effected through hydraulic elements which move a control center at the end of a control arm extending through the hollow rotor hub.

Elements common in some respects to the preferred embodiments of the present invention are illustrated in the broken away side view, FIG. 2, which otherwise illustrates a passive embodiment of this invention, first to be described. Onto the top of conventional cross-braced mast structure generally designated a, shown in phantom lines, a heavy circular top plate 11 is welded to establish a horizontal plane. At its center is welded a vertical pivot post 12 which rises through and above a platform bushing 13 to serve as the center of a circular support platform 15 of larger diameter than the top plate 11 and supported on the top plate outer edge 16 by angularly spaced C-shaped bearing assemblies 17 which grasp it as shown in FIG. 2. This construction affords to the platform 15 means to permit its yawing motions about the central vertical axis b, in response to changes in wind direction, these components being generally described herein as "wind-responsive components".

A passive embodiment of the invention is shown in FIGS. 1 and 2. Bolted by base flanges along that edge of the support platform 15 which is to extend forwardly is a large diameter hub bearing 20 against which presses a thrust face 21 of the hollow aft portion 22 of a rotor hub generally designated 23 whose nose part 24 is bolted to its aft portion 22. The rotor hub is mounted for rotation along the rotor axis c which extends horizontally.

Clamped between the hub aft and forward portions 22, 24, in tapered elastomeric bushings 27, shown in FIG. 1, are tapering frusto-conical steel sleeves 28 brazed to the exterior surface of a steel rotor blade common shaft 30 which extends transversely across and beyond the assembled hub 23 for cyclic oscillation within the elastomeric bushings 27 along the bushing axis d. These are the preferred shaft bearing means because they readily accommodate its small reversing angular motions within the necessary cyclic pitch variations range of ±6°, without undue wear or galling of the shaft (as may result from use of roller bearings); further, their securement at a central pitch angle position provides a small restoring centering force. The tapered frusto-conical sleeves 28 which face inward as shown in FIG. 1 maintain the common shaft 30 precisely centered; hence, using the preferred two-bladed construction, conventional complex blade root bearings are wholly unnecessary. Should it be desired to use a rotor system having more than two blades, blade root bearings would of course be used, preferably with gearing to interconnect the blades so that cyclic change of pitch variation of one blade would be accompanied by precisely corresponding cyclic pitch change of the remainder.

In the two blade system illustrated, this is accomplished automatically by the simple oscillation of the common shaft 30, as seen in phantom lines in FIG. 2. Thus, as the rotor rotates about its horizontal axis, cyclic pitch variation of the shaft 30 to increase the angle at which one blade 35 meets the relative wind is accompanied by a corresponding decrease of the pitch angle of the outer blade 35.

On the shaft ends 31 which projects from the hub 23 are mounted two matched blades 35 preferably having the tapered and twisted airfoil shape shown schematically in FIG. 2 and whose aerodynamic centers 36, shown by a conventional symbol, lie aft of the common shaft axis d; the blades being effectively canted aft and outwardly. Alternatively, the cyclic pitch axis may be angularly offset from the common shaft axis, and the blades aligned with the common shaft axis. The aerodynamic forces generated thus apply positive centering torque to the transverse common shaft 30. If desired, the blades may be shaped to effectively cant slightly aft from the bushing axis d, or other means conventional to rotor and propeller designers may be utilized to augment such positive centering forces.

In the passive embodiment of invention so far described, the hub need not be hollow as shown in the drawings; this hollow is significant only for the active embodiment, to be described later. For simplicity of illustration, however, both of the embodiments shown utilize the hollow hub illustrated in FIGS. 1 and 2. To the hollow aft portion 22 of the hub 23 is secured hollow driving ring gear 37 whose hollow is as large as the aft portion of the hub and having external teeth 38 which drive the generator to be described.

In both embodiments illustrated in detail, in which the corresponding parts are similarly numbered, power is delivered from the driving ring gear 37 of the hub 23 to a driven gear 41 on the shaft of power extracting means, here shown to be a generator generally designated 44. As also seen in FIG. 4, the generator casing 45 has hub-like soft elastomeric bushings 47 to permit torsional displacement of the casing 45 relative to the steel generator supports 48 which surround the bushings 47. The electrical coupling of the generator 44 to a transmission grid is conventional and not shown.

In the embodiment being described in which the rotor hub 23 projects the blades 35 forwardly of the mast structure a, a generally trailing wind alignment vane 50 to be described hereafter, projects from the trailing end of a principal boom 51 mounted to the platform 15 on a bushing on the vertical pivot post 12. Pivoting movement is accomplished by providing, at the inner end of the boom 51, a gear sector 52 driven by a worm gear 53 as seen in FIG. 1. A conventional reversible driving motor 54 angularly positions the boom 51 and hence the trailing vane 50 which aligns with the wind; by this alignment, the rotor axis c is adjustably positioned out of wind alignment, through a working range from alignment or near alignment to substantially 90° out of alignment. Thus, the wind direction arrow at the top of FIG. 1 is shown in alignment with the boom 51 and its trailing vane 50; while the rotor axis c is shown in a normal low-wind operating position at approximately 20° out of alignment. As will hereafter be explained, as the wind speed increases the control components acting through the drive motor 54 so angularly adjusts the boom 51 relative to the rotor axis c as to position the latter as much as 90° out of alignment with the wind, as shown in phantom lines at the left side of FIG. 1.

To assure smooth transition through such angular range and avoid the imposition of substantial side forces on the trailing vane 50 to balance off side wind forces on the rotor blades 35, a secondary fixed boom 56 is preferably provided, which extends from the support platform 15 outward opposite to and in substantial alignment with the rotor axis c. It terminates in a side balance vane 57, substantially smaller than the trailing edge vane 50 and positioned inward of it, and somewhat lower, as shown in FIG. 2. Its function is to afford partial balance of side wind forces on the rotor when the rotor axis c is angularly offset from the wind direction. In a particular system these forces may vary substantially with the degree of angular offset; to compensate for such variation the side balance vane 57 may be pivotably mounted along a vertical axis 58 and may have a combined pressure sensor and actuator 59 by whose angular adjustment the balance of side wind forces may be trimmed.

The controls illustrated in FIG. 1 will now be described. Limiting yaw response to a safe rate, whether because of wind shift or one of the other inputs, is effected by a conventional electric powered gyro generally designated 61 whose cage tilts to transmit through the linkage generally designated 62 a force input to an electronic rate of yaw control 63. This control provides one of the inputs to the drive motor 54. Under circumstances where change in rotor speed or generator torque are also involved, the rate of yaw gyro 61 and its control 63 also modulate the output signal of an r.p.m.-torque electronic control generally designated 64, of conventional design, which senses through leads 65 the speed and torque experienced by the generator 44. By so doing, the rate of yawing response to correct for a change in speed or torque is limited to a safe rate.

At low winds, the speed input to the r.p.m.-torque control 64 may be the parameter chosen to govern its output, to head the rotor axis c more closely into the wind at any drop below design speed. Assuming the generator 44 is the alternating current type and connected conventionally to a grid, once design rotor speed is achieved the torque of the generator 64 may be the parameter chosen to govern the output of the r.p.m.-torque control 64, and take control of the rotor heading.

Like the yaw control 63, the output of the r.p.m.-torque control 64 operates the reversible drive motor 54. Thus, with the control system postulated, after design speed has been reached any increase in torque will result in driving through the worm gear 53 to yaw platform 15 relative to the windalignment vane 50 of the boom 51. This increases the angular heading of the rotor axis c out of the wind, thus cutting down the effective wind speed, which reduces the generator speed or torque. This reaction is sensed by the r.p.m.-torque control 63 which compensatingly drives the gearing to effect a stable order of corrections. With a new steady state achieved, the system maintains effectively constant the chosen generator parameter at varying headings accommodated by the passive cyclic pitch variation of the blades 35.

The combined wind sensor and pressure actuator 59, shown schematically, may be used to trim the position of the platform 15, balancing the side wind on the rotor system at varying angles of the rotor axis c to the relative wind, otherwise the wind-alignment vane 50 on the principal boom 51 would have to balance such side winds. The sensor element of this sensor actuator 59, sensing any side force on the trimming vane 57, transmits a measure of this force to the electronic side wind control 66 which operates an electric motor in the actuator 59 to afford necessary trimming control. Optionally, the side wind electronic control 66 may be designed to function in event of a wind shift by interacting with the yaw control 63 and r.p.m.-control 64 according to a preselected conventionally designed intelligence program.

Summarizing the functioning of this embodiment, changes in wind speed through a broad range of operating conditions, as well as changes of wind direction, will be sensed as changes in a chosen operating parameter, such as generator torque; the motor drive 54 from the electronic r.p.m.-torque control 64, and worm gearing to the boom 51 will constantly reposition the rotor axis c angularly, subject to yaw rate limitation by the gyro 61 and its yaw-limiting control 63; while the blades 35 oscillate cyclically to adapt their pitch, so permitting the rotor to operate over a yaw angle range of nearly 90°.

The actively controlled rotor system shown in the remaining figures will now be described. This is a simple servo-controlled system in which rotor blades 35' are mounted on the leeward side of the rotating platform 15' which is supported by C-shaped bearing assemblies 17' for rotation about the circular top plate 11' of a cross-braced mast structure a'. A large diameter hub bearing 20' supports a rotor hub generally designated 23' whose hollow portion 22' opens forward; this end of the hub 23' is attached to a driving ring gear 37' whose thrust is resisted by the bearing 20', and which has a central hollow in alignment with that of the rotor hub portion 22. The common shaft 30' which bears the blades 35' has, within the hub, tapered sleeves 28' which oscillate within elastomeric bearings 27', in the same manner as in the preceeding embodiment.

As the rotor turns, power is transmitted from the driving ring gear 37' to a driven gear 41' which drives a generator generally designated 44', whose casing 45' may deflect angularly in soft elastomeric bearings 47' held by generator supports 48' which are secured to the platform 15'.

Figure 4A:
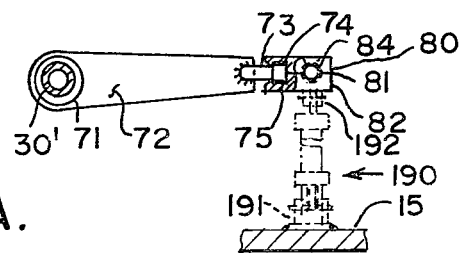
FIG. 4A is a fragmentary view showing the cyclic pitch control arm as seen along line 4A—4A of FIG. 4. The phantom lines show a link for limiting rotor pitching, which optionally may be employed.

At this point, the similarity between this embodiment and the embodiment of FIG. 1 ceases. Active control of the cyclic pitch variation angle of the common shaft 30' is obtained by brazing at its center a steel sleeve 71, as seen in FIGS. 4 and 4(a), onto which in turn is brazed a slender planar steel control arm 72 hereinafter referred to as the control flexure. The flexure arm 72 is slender, measured axially along the common shaft, and deep, measured transversely to it, so as to be stiff in-plane and to bend readily out-of-plane. It extends forward from the sleeve 71 through the hollow of the hub 22' and ring gear 37' to a forward-projecting rigidly connected stub shaft 73 on whose forward end is mounted a bearing 74 whose axis is directed toward the common shaft 30' (assuming that the flexure is undeflected) and which rotates within the bearing socket portion 75 of a cyclic pitch center generally designated 80, as seen in FIGS. 4, 4A and 5. The flexure 72 thus serves as an arm whose forward end is rotatable within the cyclic pitch center 80.

To aid in understanding how the control flexure 72 functions, reference is had to FIG. 9, showing schematically a mechanically equivalent construction. A straight rigid arm bracket 76 having a clevis end 77 swivels angularly on aligned trunnion pins 78 projecting, perpendicularly to the axis of the common shaft 30', from opposite sides of the center station of a rotor blade common shaft 30''. The rotor system there illustrated is shown rotating about a rotor axis c in the sense shown by the double headed arrows; the rigid arm bracket 76 is shown deflected from the rotor axis through an exaggeratedly enlarged angle e. The rigid arm bracket 76 has its own effective axis of rotation or centerline f extending from the common shaft to a rotation-permitting cyclic pitch control center 79.

Unless the rigid arm bracket 76 is deflected from the axis c, rotation of the rotor about its axis c will cause no oscillation of the common shaft 30''. When so deflected through the angle e, rotation of the rotor blades is effectively about the transversely deflected cyclic pitch control center 39; as the trunnion pins 78 rotate in a plane perpendicular to the bracket centerline f the common shaft must rock or oscillate, as shown by the short arrows of FIG. 9.

The same result follows from the use of the flexure 72 which, though stiff transverse to the common shaft, readily flexes out-of-plane, as shown in FIG. 4, when the cyclic pitch center 80 is deflected transversely. Because of its in-plane stiffness, rotation of the rotor system about the axis c will cause cyclic pitch angle variation in the same manner as if the pivoted rigid arm 76 had been employed.

The cyclic pitch center 80 may be constructed in any convenient manner. As illustrated in FIGS. 4 and 4A it may consist of an upper half 81 and lower half 82 joined to provide between them the bearing socket portion 75 and forward of it a spherical cavity 84 having a clearance entrant portion 85 at its side shown to the left in FIG. 4. To move the cyclic pitch center 80 transversely a first conventional link 87 extends transversely from an end in the pitch center cavity 84 to a second link generally designated 90, hereafter referred to as a yieldable self-restoring link whose construction and operation will be described. The yieldable link 90 in turn extends axially from the output shaft 91 of a servo-control generally designated 93, to be described, actuated through linkages in response to selected sensed conditions, here shown for simplicity to be a generator torque condition and a rate of yaw condition. Each of these link connections permits only limited deflection in the vertical plane, so that their movements of the pitch control center will be principally transverse.

To show how simply a generator torque condition may be sensed and transmitted, FIG. 6 shows the forward end support 48' of the generator 44'; its soft supporting elastomeric bearings 47' permit the generator casing 45' to deflect angularly as torque increases, turning in the sense shown by the curved arrows. An upper projecting arm 96 is mounted on the generator casing outward of the bushing 47; near its upper end is secured one end of a somewhat preloaded tension spring 98 which biases the generator casing 45 in the opposite sense, urging a corresponding lower arm 99 against a fixed stop 101. This establishes a minimum torque setting for the generator casing 45; the reaction from greater torque will tend to turn the generator casing 45 in the sense shown by the curved arrows and drive the upper arm 96 in the direction shown to the right in FIG. 6.

At the uppermost end of the upper arm 96 is connected a sideward extending torque control link 102, shown in FIGS. 4 and 6, which connects with a fore-and-aft link member 103, whose forward end is pivot-mounted to a bell crank 104 which moves it essentially transversely in response to tilting of the cage of a yaw gyro generally designated 61'. Through movement of either the torque link 102 or the yaw gyro 61'. Transverse deflection of the fore-and-aft link 103 moves a transverse control link 105 whose far end is secured in a clevis fitting or lug 106 securely attached to the casing of the servo-control 93. Other operating parameters, effective to maintain a selected condition of the generator (or other operating components) by yawing the supported components, may likewise be transmitted to the servo-control 93, now to be described.

Referring to FIGS. 4 and 5, the servo-control generally designated 93 includes two principal parts: a control cylinder generally designated 110 and a servo-valve generally designated 120. The control cylinder 110 has a reversible piston 111, whose shaft end projects from an output end cap 113. The cylinder 110 further has, affixed to its opposite end cap 114 in axial alignment with the piston 111, the servo-valve 120 powered by a hydraulic accumulator system generally designated 122 which supplies it conventionally with hydraulic fluid under pressure.

The servo-control system 93 as a whole is supported by a rigid platform-mounted bracket 124 as seen in FIG. 5; it is firmly secured to the upper end of the bracket 124 by the operator clevis lug 126 of the servo-valve 120.

This valve is of the type which is closed when the operator lug 126 is in centered position; which when the operator lug 126 is axially depressed causes flow through actuator conduits 128 to and from the control cylinder 110 in one sense; and when the operator lug 126 is extended axially causes flow through the conduits 128 in the opposite sense. Only a small deflection of the control cylinder 110 relative to the operator lug 126 is required to operate the servo-control 93 in either sense.

Referring to FIG. 4, the movement of the control cylinder 110 in either sense which so actuates the servo-control 93 may be either transverse movement of the cyclic pitch center 80 acting through the plunger 111, or transverse movement of the lug or fitting 106 at the cylinder end cap 113, which transfers the movement of the transverse control link 105.

For example, should the generator torque increase over its design operating value due to increase in wind speed, the angular deflection of the generator casing 45' in torsion would so operate the transverse control link 105 as to move the control cylinder 110 axially relative to the servo-valve operator lug 116. This would cause such a flow into the control cylinder 110 as to move its piston 110 and hence the cyclic pitch center 80 transversely, changing the blade cyclic pitch variation angle and causing the rotor to yaw, by aerodynamic forces exerted by the blades 35', to an angular position at which the design generator torque would be restored; meanwhile the feed of hydraulic fluid into the control cylinder 110 would be modulated by the rate of yaw gyro 61' acting through the bell crank 108 on the same transverse control link 105.

A sudden change in wind direction will cause a difference in aerodynamic loadings on the advancing and retreating blades 35'; this will exert a force largely transverse on the control center 80, even prior to being reflected as a decrease in generator torque. As such a force is transmitted through the yieldable link 90, it will also unseat the servo-control valve 120, causing such flow into the control cylinder 110 as positively displaces the cyclic pitch center 80, causing the blades 35 to undergo such a change in cyclic pitch angle variation as will quickly yaw the rotor, in the sense that will either restore the prior angular offset from the wind direction or evolve a new angular offset suited, under a change of wind, to maintain the torque of the generator 45' constant.

The servo-control system described thus responds promptly in a restorative sense to any sensed error or departure from a chosen operating parameter. Its response is effectively proportionate to the sensed error; and it continuously checks and modifies its response to hunt for a newly stable position; it may be so powered, by the hydraulic system 122 or any mechanical, electrical or other equivalent, to respond powerfully, creating a rate of yaw safely limited by the gyro 61'.

The yieldable self-restoring link generally designated 90, seen in FIGS. 4 and 5, intermediate between the cyclic pitch control center 80 and the servo-control cylinder 110, serves under conditions of extreme gusts to permit the rotor blades 35' to adjust their pitch suddenly; it temporarily makes the rotor system somewhat "passive", with much of the safety against destruction as with the embodiment shown in FIGS. 1 and 2. Despite the seeming flexibility of the flexure 72, its in-plane stiffness is so great as to make the self-restoring link 90 valuable.

Referring to FIG. 7, the yieldable and self-restoring functions of the link 90 are achieved by the following construction: a hollow cylindrical oil-filled body 141 has two end caps 142, 143 whose central bores accommodate both end portions of a piston rod 144 bearing an intermediate-positioned piston 145, urged toward center by a pair of centering compression springs 146. The total interior volume for oil remains constant over the full range of movement of the piston 145. The end cap 143 has a pair of elongated clevis lugs 147 spaced alongside the projecting end of the rod 144; these long clevis lugs have near their outer ends, shown to the left of FIG. 7, aligned mounting bores 148 which are so spaced from the end cap 143 as to permit full range of movement of the piston 145 between the springs 146 in the dashpot body 141. Opposite to the clevis lug ends, the projecting end of the piston rod 144 has a rod end 149.

Oil may travel through the piston 145 through a valve shown in the enlarged detail FIG. 8. A relatively small bore 151 extends from one side of the piston 145 to an enlarged counterbore 152 in the other side, in which one of a pair of springs 153 is seated, to press against a ball 154. In its normally centered position, shown in FIG. 8, the ball 154 fits with preselected clearance in the central bore 155 of a washer 156. A second spring 153 fits against the opposite side of the ball 154 and is seated in an opposite counterbore 158 which continues the bore 159 of a mounting plate 160, secured to the piston 145 along with the washer 156 by screws 161.

Relatively small continuing loads will be transmitted by the yieldable self-restoring link 90 with a slightly cushioned effect as the compression springs 146 deflect to the extent permitted by the flow which can leak or "bleed" through the space provided between the ball 154 and washer bore 155. A continuous force application may thus cause the link 90 to take up such deflected position as results from the balance of forces on the centering springs 146.

Should a sudden wind gust be encountered, which might overload the rotor blades 35' unless the pitch control center 80 moved quickly, the piston 145 will so load the hydraulic fluid on its one side as to displace the ball 154 from its centered position to the phantom line position of FIG. 8, providing rapid flow of the hydraulic fluid to the opposite side of the piston and hence rapid piston movement. This permits the actively controlled blades 35' of the present embodiment to adjust their pitch, under conditions of severe gust loading, with a freedom somewhat comparable to that of the first described passive embodiment. As movement of the piston 145 accommodates the gust loading, the valve ball 154 will return to center position. Thereafter the centering springs 146 gradually restore the position of the piston 145 as the hydraulic fluid bleeds past the now centered ball 154.

In some rotor installations it may be desired to restrain the rotor in pitch. For this purpose a second yieldable self-restoring link 190, shown in phantom in FIG. 5, of identical construction to that of the link 90, may be installed in substantially vertical position, mounted to a downward-projecting lug 192 there shown extending from the lower half of the pitch control center 80 and, at its lower end, pivoted in a transverse plane relative to a bracket 191 on the platform 15.

Provisions for starting horizontal-axis wind generators are conventional. By conventional switch controls, not illustrated, the field of the generator is disengaged; this minimizes resistance encountered in starting. Where the generator is part of an electrical grid, the grid current may be used for starting. Other known expedients are supplementary folding starting vanes used to position the rotor axis at a selected angle—say 20°—out of the wind. Since the embodiments of the invention here described are designed to operate at varying yaw angles, they are easily adapted for such starting out of the wind. For example, stops may be utilized to establish a minimum angle of cyclic oscillation of the common shaft 30' in the FIG. 4 embodiment, to attain a stable position of the rotor at such minimum angle out of the wind.

In both of the embodiments illustrated, it is desirable in any event to maintain at least some minimum angle of the rotor axis relative to the wind, for following shifting winds and for smoother yaw angle transition with changing wind speeds. Adjustment of the yaw angle relative to the wind for change in wind speed is faster and surer if the lower yaw angles are avoided. For example, if the generator has achieved a design parameter with the rotor operating a 30° yaw angle (which reduces the effective wind speed less than 14%) a change in wind speed will require a lesser degree of yawing correction than if the rotor yaw angle had been say 20°. Practical operation of simple embodiments may, if desired, be limited to a range of say 30° to 75°; at this larger angle the effective wind speed is roughly one-fourth its actual speed and will permit continued power generation as well as continuing adaptation to shifts of wind direction.

In using the present invention, operation is feasible with the rotor axis in the range from at or near alignment with the relative wind to substantially 90° therefrom. Since the cosine of the angle of the rotor axis to the relative wind is the significant function, reference herein to an angular position near alignment with the wind is to be understood to allow for that angular latitude over which the effective wind speed is substantially realized. The speedy corrections in yaw effected by the present invention, and the attendant constancy of rotor r.p.m. effectively compensate for the small theoretical loss of wind speed which follows from operation of the rotor at some angle to the wind.

An established yaw angle of substantially 90° is suited for effectively parking the rotor in extremely high winds. In this condition, the generator is to be electrically disconnected and the rotor permitted to idle. At this angle, the full range of cyclic pitch angle variation is utilized, which for blades of conventional aerodynamic cross-section may be approximately ±6°. This condition illustrates one of the substantial advantages of the present invention; the blades are not feathered as with conventional horizontal axis rotors. Blade feathering requires a range of movement not used for ordinary operation; also it positions the blades so nearly flat that, when near horizontal their own weight is resisted in bending by their minimum strength cross-section; this may dangerously over-stress them. Hence, the present invention is not only more simple to build, but lighter and safer than conventional machines.

While a generator is included in both the illustrated embodiments, other power extracting means, such as a pump, may be coupled to the rotor; and such power extracting means need not be supported on the rotating platform atop the mast. The elements of the embodiments of FIGS. 1–9 may be used in other combinations. For example, by positioning a rotor leeward of the mast, in FIG. 4, its aerodynamic drag tends strongly to align it with the wind; this tendency may be offset by use of an appropriately sized oppositely positioned aerodynamic balancing surface like that of FIG. 1, but projecting in the opposite direction. It is to be understood that these two embodiments are thus illustrative of the invention, rather than the invention itself.

The controls illustrated will suggest more complex systems to persons who may desire them. For example, control may be exerted from remote locations; rate of yaw may be sensed from actual movement about the mast; torsional dampers may be used for control to the rate of yaw with only limited loading of the mast; mechanical or electrical equivalents to servo-control may be employed; and other control apparatus, such as side wheels and controllable aerodynamic surfaces, may be added or substituted. Also, it will be obvious that some rotor operating parameters may be sensed directly from a generator, as illustrated herein; hence, the term "rotor parameter" is to be deemed to include generator parameter. These and other variations will from this disclosure suggest themselves to persons skilled in the art.

When rotor blades are free to adapt their pitch cyclically as in the present passive systems, it is found that the rotor thrust vector will remain substantially aligned with the rotor axis regardless of the extent to which the rotor is operating in a side wind. This phenomenon makes it possible even in a very simple machine to control the rotor by maintaining its thrust substantially constant after reaching design thrust. Using the configuration illustrated schematically in FIGS. 10 and 11, in which familiar power-extracting components are not shown, a platform 15" atop a rotor mast, not shown, is free to move angularly about its vertical yaw axis b. The rotor hub bearing generally designated 22" of a passive cyclic pitch hub 23" is set so that its horizontal axis c" is positioned at a substantial offset relative to the yaw axis d. The rotor system, including common shaft and blade borne by it and carried by the cyclic pitch hub 23" may be the same as in the first described embodiment. The description of these components is therefore not repeated.

Figure 10:
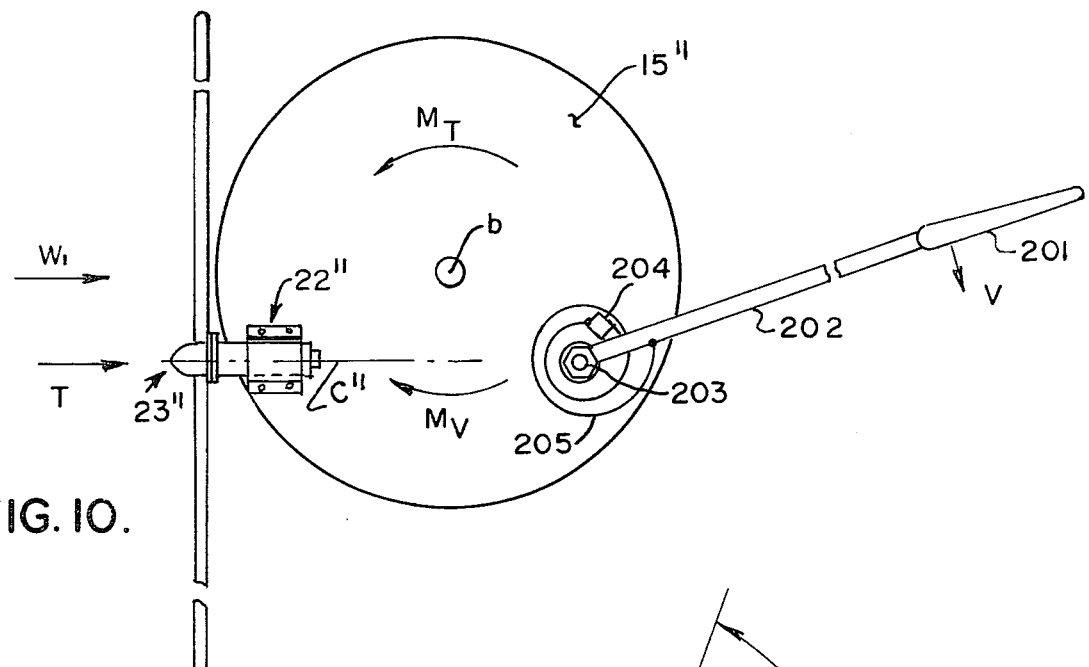
FIG. 10 is a schematic view, at low wind speed, of a still further embodiment of horizontal axis wind generator using passive cyclic pitch. In this embodiment, the windward rotor is positioned with its thrust axis offset from the yaw axis of the machine.
Figure 11:
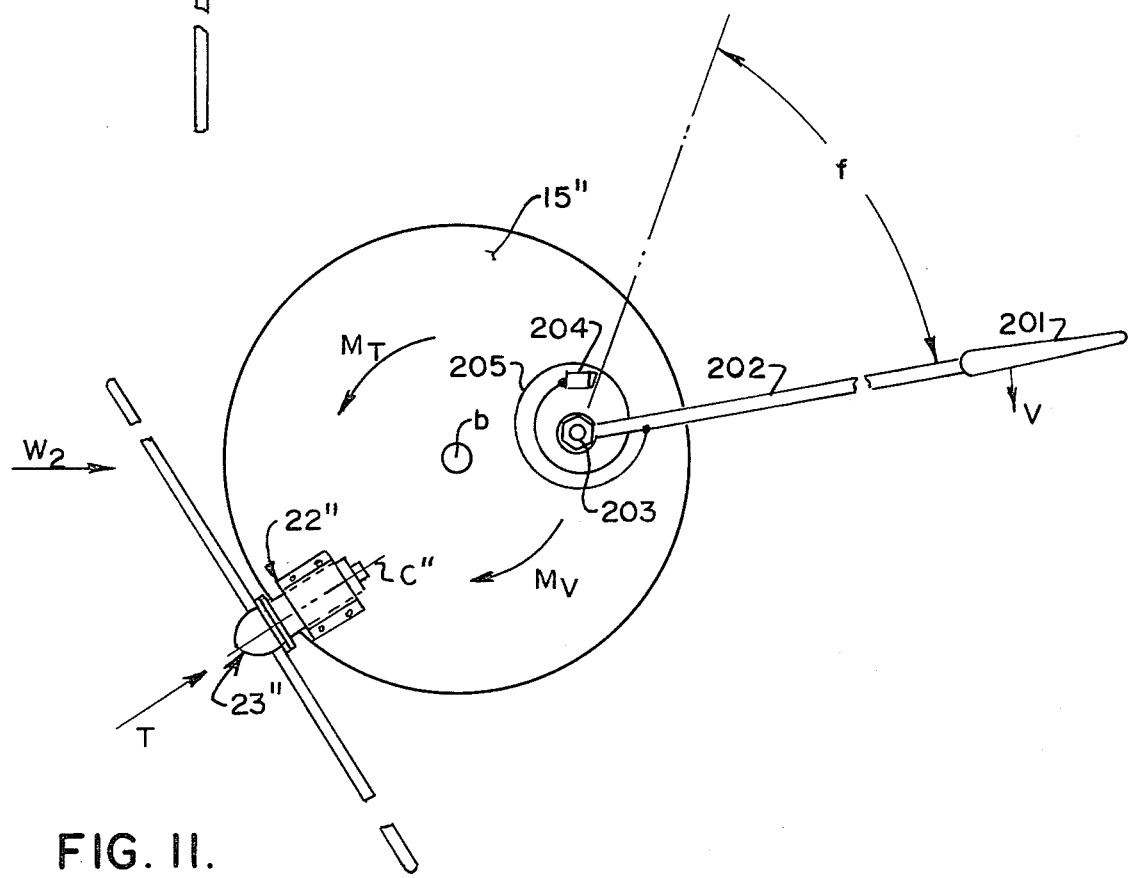
FIG. 11 is a schematic view showing the position of the machine of FIG. 10 at high wind speed.

With such an adaptive cyclic pitch rotor, its thrust T will remain directed substantially along the hub axis c", regardless whether the wind is the low wind $W_1$ as shown in FIG. 10, whose direction is aligned or nearly aligned with the thrust axis c", or the high wind $W_2$, shown in FIG. 11. The object of this embodiment is to control the rotor thrust as the design operating parameter, so that after design thrust is reached it remains substantially constant; hence, at increasing wind speeds it must yaw progressively out of the wind. Accordingly, at the higher wind speed illustrated in FIG. 11, the angle of yaw will be relatively great, ranging up to a possible 90°.

The aerodynamic force V on a trailing airfoil-shaped vane 201 at the end of a boom 202 provides the necessary moment to balance the moment of the thrust exerted by the rotor platform 15". The boom 202 is mounted to the platform 15 by a vertical pivot 203 whose position is set at low wind against a stop 204, at which the angularity of the boom axis is as shown in FIG. 10. As the wind attains design operating speed, the moment of the thrust of the offset rotor must be balanced by the moment of the aerodynamic force V, which is a function of the wind speed and of the angle of attack of the vane 201. To keep this moment substantially constant after reaching design thrust, a moment-limiting mechanism is used, the one here shown being a torsion spring 205 whose spring rate is near zero so that over the angular range f over which it permits the boom 202 to pivot, the moment $M_V$ must be substantially constant. With the moment $M_V$ so determined by the moment transmissible by the torsion spring 205, with changes of wind speed the machine will yaw about the axis b until the thrust moment $M_T$ balances the moment due to the aerodynamic force on the vane $M_V$. Since the rotor thrust axis is always in substantial alignment with the rotor axis c" in the adaptive cyclic pitch hub system here described, after its design thrust is reached the rotor thrust is, by the disclosed construction, maintained substantially constant at a design value regardless of changes in wind speed. An advantage of this thrust-limiting system is that it minimizes the load on the supporting mast. In contrast, in those conventional rotors which are stopped in high winds, with feathering the blades, the thrust on the rotor will increase with wind speed, and high mast loads result. It will be apparent that other mechanisms may be utilized to achieve the torque-limiting function of the torsion spring 205; for example, a hydraulic system will from this disclosure be self-evident to those skilled in the art.

We claim:

1. A wind energy conversion machine comprising mast structure,
   means for permitting yawing motions at the upper end thereof about a vertical axis, and
   wind-responsive components supported on said yaw-permitting means, said components comprising
   hub bearing means to establish substantially horizontal rotor axis, and
   a rotor having a hub so mounted rotatably in said bearing means as to project the rotor to one side of said mast structure,
   the hub having means coupling its rotation to power extracting means, and further having, outwardly of said bearing means,
   a transverse shaft having angular oscillation-permitting means supporting it relative to the hub and projecting at each side of the hub, and
   a pair of rotor blades mounted on the projecting ends of said transverse shaft,
   whereby as the rotor rotates about its said horizontal axis, cyclic pitch variation of the shaft to increase the angle at which one blade meets the relative wind is accompanied by a corresponding decrease of the pitch angle of the other blade, together with
   means independent of the mast structure to so yaw the said supported components as to effect an angular offset of said rotor axis relative to the wind direction, which offset increases with wind speed.

2. A wind energy conversion machine as defined in claim 1, in which
   the said transverse shaft support bushing means are elastomeric bushings,
   whereby to accommodate small reversing angular motions of the transverse shaft without galling and to bias the shaft toward a centered pitch angle position.

3. A wind energy conversion machine as defined in claim 1, wherein
   the blades are so mounted, relative to the axis of their angular oscillation-permitting means, that the aerodynamic center of each is aft of said axis,
   whereby the resultant aerodynamic forces on the blades apply positive centering torque.

4. A wind energy conversion machine as defined in claim 1, together with means extending from the common shaft through the hub to apply cyclically to the transverse shaft a pitch angle variation.

5. A wind energy conversion machine as defined in claim 1, together with a rotation-permitting cyclic pitch center transversely offsettable from the rotor axis, and a control arm mounted to the common shaft at its intersection with the rotor axis, substantially pivoted on an axis perpendicular to the common shaft axis, and extending therefrom through the hub to said offsettable pitch center along a line effectively perpendicular to such substantial pivot axis, whereas as the hub rotates about the rotor axis, when the cyclic pitch center is offset therefrom the common shaft will rock cyclically through a cyclic pitch variation angle.

6. A wind energy conversion machine as defined in claim 5, further comprising control means coupled to said cyclic pitch center to control its transverse offset from the rotor axis, whereby to effect operation of the machine at an angular offset of its rotor axis relative to wind direction, which offset increases with wind speed.

7. A wind energy conversion machine as defined in claim 1, together with a rotation-permitting cyclic pitch center transversely offsettable from the rotor axis, and a control arm of the flat planar metal flexure type brazed perpendicular to the axis of the common shaft and extending through the hub to an arm end rotatable within said pitch center.

8. A wind energy conversion machine comprising mast structure, means for permitting yawing motions at the upper end thereof about a vertical axis, and wind-responsive components rotatably supported on said yaw-permitting means, said components comprising hub bearing means to establish a substantially horizontal rotor axis, and a rotor having a hub so mounted rotatably in said bearing means as to project the rotor to one side of the mast structure, power extracting means, the hub having means coupling its rotation to said power extracting means, the rotor further having, outwardly of its said bearing means, a plurality of rotor blades, pitch change-permitting means to mount said blades to said hub, means to so interconnect said blades that cyclic change of pitch of one thereof is accompanied by cyclic pitch change of the remainder thereof, and means independent of the mast structure to so yaw the supported components as to effect an angular offset of said rotor axis relative to the wind direction, which offset increases with wind speed.

9. A wind energy conversion machine as defined in claim 8, further comprising means to sense and limit the rate of yaw of said supported components.

10. A wind energy conversion machine having actively controlled cyclic pitch variation, comprising the machine as defined in claim 9, together with means to provide a cyclic pitch center so coupled to the blade pitch change-permitting means as to be offset transversely from the rotor axis increasingly with increase of cyclic pitch variation, and in which said means to yaw the supported components comprises control means to move said cyclic pitch center transversely.

11. A wind energy conversion machine as defined in claim 10, in which said control means to move said cyclic pitch center transversely includes means to sense a rotor operating parameter desired to be maintained, and servo-control means actuated responsive to changes of such rotor parameter, whereby to substantially maintain said condition by yawing the supported components.

12. A wind energy conversion machine as defined in claim 10, further having means to afford vertical restraint to said means to provide a cyclic pitch center whereby to afford self-restoring accommodation of rotor pitching.

13. A wind energy conversion machine as defined in claim 11, in which the servo-control means comprises a servo-control valve of the type having an axially reversible operating plunger, reversible linear actuator means including a casing secured to said valve, in alignment with its plunger, further having an output rod operatably coupled to said cyclic pitch center, means to mount the actuator and valve by said reversible plunger, and control means to deflect the linear actuator casing transversely in opposite directions in response to said changes of a selected rotor parameter, whereby the deflection of the casing so operates said reversible servocontrol means as to traverse the cyclic pitch center and by control of the rotor maintain said selected rotor parameter substantially constant.

14. A wind energy conversion machine whose blades passively adapt their cyclic pitch to offset the rotor axis relative to wind direction, comprising a wind energy conversion machine as defined in claim 8 in which said means to interconnect the blades for cyclic pitch change is substantially free of control, whereby to permit their cyclic oscillating adaptation to side winds, and the rotor hub projects the rotor forwardly of the platform means and mast structure, and in which said means to yaw the supported components relative to wind direction comprises a principal boom pivot-mounted to the platform along the vertical axis and having a wind alignment vane at the trailing end thereof, and in which the supported components further comprise variable position drive means to set the angle of the principal boom relative to the rotor axis through an angular range of operation, and means responsive to a chosen rotor parameter to so drive said variable position means as to progressively position said boom within said angular range, whereby to maintain said chosen parameter.

15. A wind energy conversion machine as defined in claim 14, the platform means having fixed in substantial alignment with the rotor axis a secondary boom terminating in side balance vane means, whereby to afford partial balance of side wind forces on the rotor when its axis is angularly offset relative to wind direction.

16. A wind energy conversion machine as defined in claim 14, said side-balance vane means being mounted pivotally along a vertical axis and having a side wind pressure sensor, and means to trim said side balance vane means responsive to side wind forces sensed by said sensor.

17. A wind energy conversion machine as defined in claim 14, together with means to sense and limit the rate of yaw of the supported components.

18. A wind energy conversion machine as defined in claim 14, in which said chosen rotor parameter to be maintained is its thrust, said variable position means to set the angle of the boom relative to the rotor axis is substantially boom moment limiting despite changes in wind speed, and said means to so yaw the supported components as to effect an angular offset of the rotor axis relative to wind direction which increases with wind speed comprises (a) an offset position of the hub horizontal axis relative to said vertical axis for yawing motion, whereby to establish a fixed moment arm for the rotor thrust, in combination with (b) the said moment-limiting variable position means to set the boom angle, whereby its moment limitation achieves balance with the moment of the rotor thrust at such a varying yaw angle relative to the wind as will maintain the rotor thrust substantially constant regardless of changes of wind speed.

* * * * *

UNITED STATES PATENT AND TRADEMARK OFFICE
CERTIFICATE OF CORRECTION

PATENT NO. : 4,298,313
DATED : November 3, 1981
INVENTOR(S) : Kurt H. Hohenemser It is certified that error appears in the above—identified patent and that said Letters Patent is hereby corrected as shown below:

In column 5, line 49, delete "outer" and substitute ---other---.

In column 14, line 17, delete "with" and substitute ---without---.

In Claim 10, line 68, delete "9" and substitute ---8---.

Signed and Sealed this

Second Day of March 1982

[SEAL]

Attest:

GERALD J. MOSSINGHOFF

Attesting Officer   Commissioner of Patents and Trademarks